Dec. 10, 1946.  O. J. SMITH  2,412,479
QUICK-ACTION GAS VALVE
Filed Oct. 15, 1942  2 Sheets-Sheet 1

Inventor
ORIS J. SMITH
By F. M. Whiteley
Attorney

Dec. 10, 1946.　　　O. J. SMITH　　　2,412,479
QUICK-ACTION GAS VALVE
Filed Oct. 15, 1942　　　2 Sheets-Sheet 2
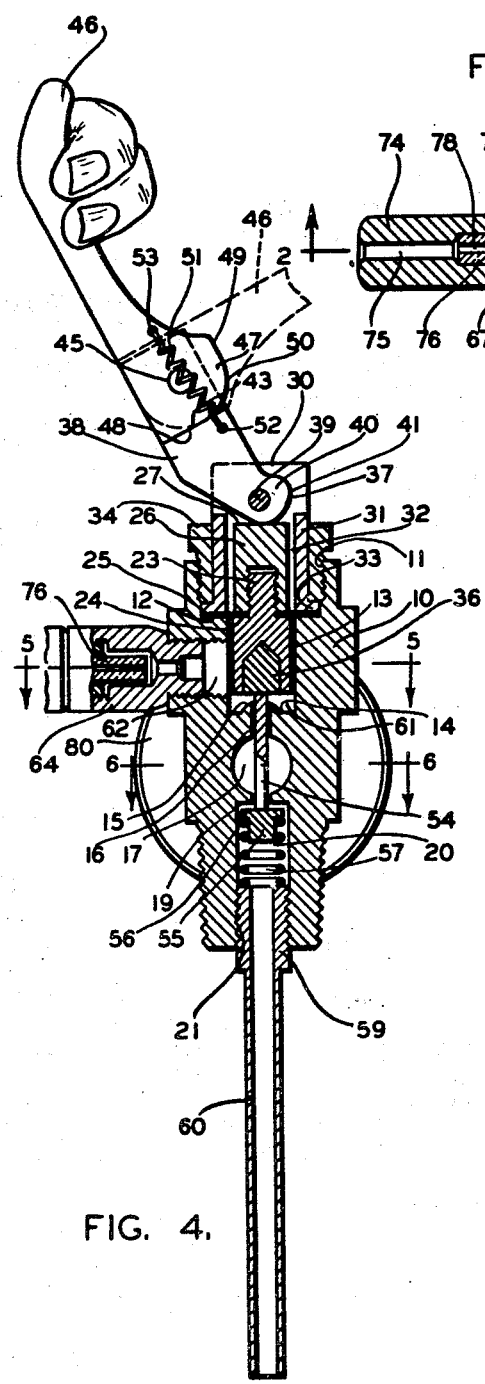
FIG. 4.
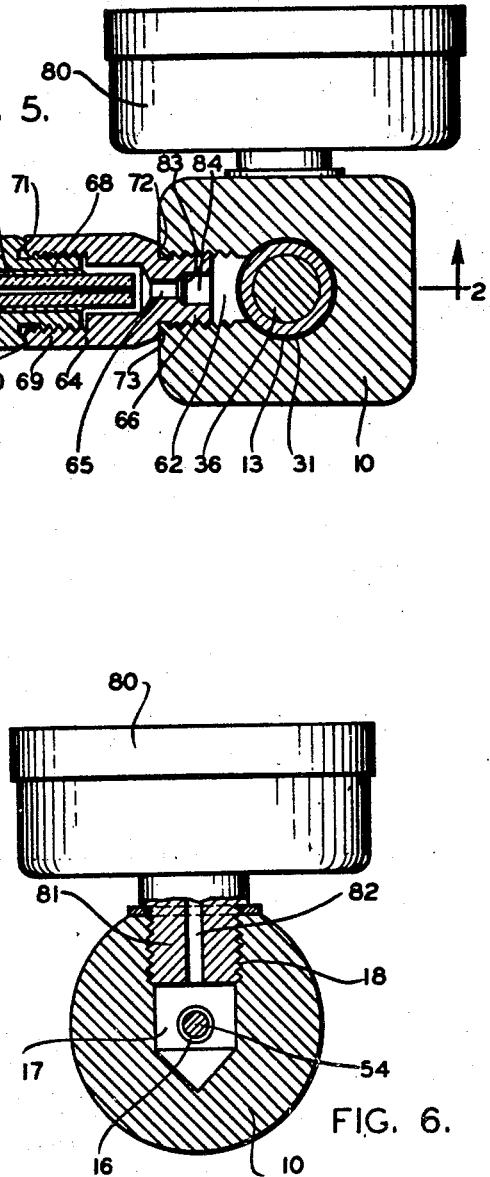
FIG. 5.
FIG. 6.
Inventor
ORIS J. SMITH
By P. A. Whiteley
Attorney Patented Dec. 10, 1946

2,412,479

UNITED STATES PATENT OFFICE 2,412,479

QUICK-ACTION GAS VALVE

Oris J. Smith, Cleveland, Ohio, assignor to Air Reduction Company, Incorporated, New York, N. Y., a corporation of New York Application October 15, 1942, Serial No. 462,450

2 Claims. (Cl. 251—132)

My invention relates to a quick-action gas valve which is designed particularly for use in connection with compressed gas containers or cylinders that are subject to temperature and barometric pressure variations, such as are used in connection with parachute escape devices employed in military aviation, and usually at very high elevations, where both barometric pressure and temperature vary very sharply from the ground pressures and temperatures. The valve mechanism for controlling flow of gas from high pressure cylinder containers may also be used in other relations.

Airplane combat now occurs at elevations of thirty thousand feet or even higher. If a plane is hit and begins to fall or catches fire so that it is necessary for those in the plane to bail out and hence to break contact with the supply of oxygen in the plane, an emergency supply in a cylinder preferably attached to the clothing must be used. It is essential, where the valve is used in connection with cylinders containing emergency supply of oxygen, that the valve closures be of such a type that leaks will not develop due to the sharp changes in temperature and surrounding air pressure. It is also highly important that the pilot or other persons required to bail out be able to open the valve easily with one hand, leaving the other hand free for other tasks such as applying the emergency mask, pulling the rip cord, and the like. Serious difficulties have been encountered because ordinary valves heretofore employed contain packing and gaskets which react to changes in pressure and temperature so as to make it extremely difficult to avoid the development of leaks, and where opening the valve requires use of both hands, one to hold the cylinder from turning, while the other turns the valve.

It is a principal object of my invention, therefore, to provide a quick-acting gas release valve which employs no packing or gaskets and seals the passages by metal-to-metal contact of the same metals, which are not affected by temperature or pressure changes and thus eliminate the possibility of leaks.

It is a further object of my invention to provide a valve structure with valve opening means which can be instantly and easily operated with the use of one hand.

It is a further object of my invention to provide a valve member embodying a plunger having a portion adapted to engage a projected valve seat in conjunction with a lever having a cam head engageable with said plunger to force it into firm valve closing position.

It is a further object of my invention to seal this plunger in the apparatus by means of a flexible metal diaphragm so that when the valve is opened no gas can escape except to the passages connecting with the emergency mask structure.

It is a further object of my invention to form said lever of pivotally inter-connected parts so that when the lever has been swung to valve closing position the pivoted portion thereof can be moved into a position close to the valve stem where it will be out of the way and not be liable to be caught by the hands or clothing of the aviator.

It is a further object of my invention to provide spring means which is compressed by lever operation for automatically opening the valve when the lever is lifted to release the valve for opening and pressure of the gas is too low to effect opening.

It is a further object of my invention to provide a removable connection to the mask tube, including a capillary limit port, which is secured to the side of the valve stem and may be removed for refilling the cylinder through the same passages by which gas flows to the limit port.

The full objects and advantages of my invention will be made to appear in the appended specification, and the novel features by means of which the aforesaid important results are obtained are particularly pointed out in the claims.

In the drawings:

Fig. 4 is a view similar to Fig. 2, on a somewhat smaller scale, showing the valve open.

Fig. 5 is a transverse sectional view taken on line 5—5 of Fig. 4.

Fig. 6 is a transverse sectional view on a somewhat enlarged scale taken on line 6—6 of Fig. 4.

Figure 1:
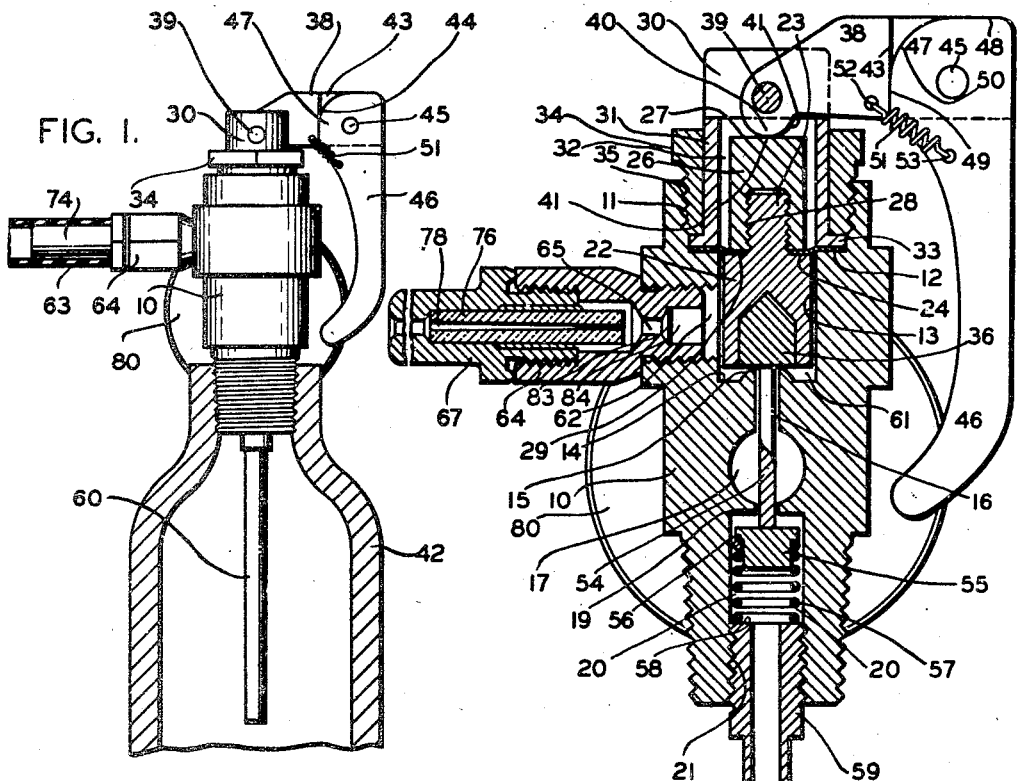
Fig. 1 is a side elevation view of a gas-containing cylinder and the valve mechanism attached thereto with parts broken away.

As shown, the main valve body comprises a casting 10. This casting is provided with an enlarged internally threaded top opening 11 having an annular bottom shoulder 12 from which extends a cylindrical opening 13 having a bottom wall 14 provided with a protruded valve seat 15. Extending through the center of said valve seat 15 is a cylindrical opening 16 which continues across a transverse chamber 17 threaded part way along the opening as indicated at 18. Below the transverse opening 17 is a continuation 19 of opening 16 which leads to a cylindrical opening 20 of considerably larger diameter and which is internally threaded along part of its extent as indicated at 21.

Figure 2:
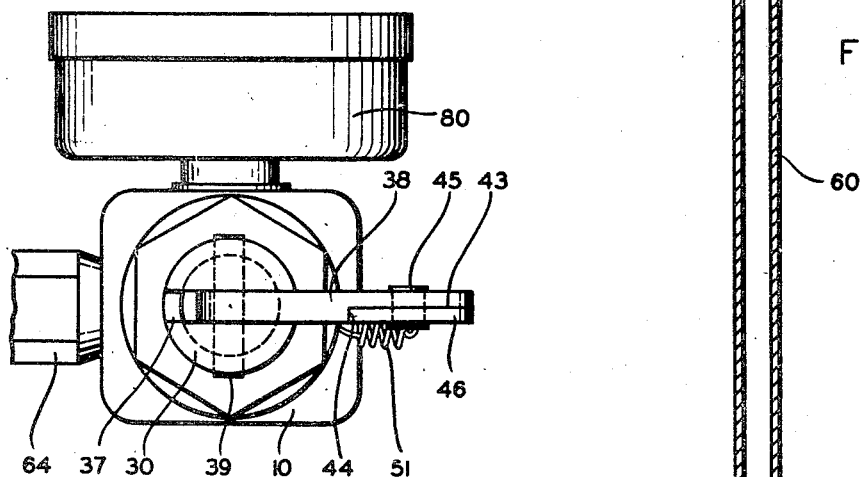
Fig. 2 is a longitudinal sectional elevation view taken on line 2—2 of Fig. 5, showing the valve and valve operating handle in closed position.

Mounted to fit loosely in the cylindrical opening 13 is a cylindrical plunger 22, Figs. 2 and 4, which is provided with a central externally threaded stud 23 with an annular shoulder 24 surrounding this stud. Upon this shoulder 24 and upon the annular shoulder 12 at the bottom of the threaded opening 11 rests a thin pliable metal washer 25. A cap nut 26 is provided with a solid head 27 and an internally threaded cylindrical bore 28, the cap nut being screwed on the stud 23 to bring its bottom annular face 29 upon the flexible metal washer 25 over the annular shoulder 24, which is milled to a plane surface to receive the plane face of flexible washer 25 and make a gas-tight seal therewith. A cylindrical head block 30 is formed with a depending sleeve portion 31 enclosing a cylindrical chamber 32. The lower portion of the sleeve 31 is provided with an annular out-turned shoulder 33. A sleeve nut 34 surrounds the sleeve 31 and engages with its lower edge the shoulder 33. As shown, the nut 34 is externally threaded as indicated at 35, and it is screwed into the internal threads of opening 11, thus clamping opposite faces of flexible washer 25 between the faces of bottom annular shoulder 12 and annular shoulder 33. These faces will be milled smooth and will provide a gas-tight union.

As shown, the plunger 22 is spaced from the walls of cylindrical opening 13 and is held in effect suspended from or floating upon the flexible metal washer 25.

The cylindrical plunger 22 is provided with a central plug 36 adapted to engage with its bottom surface the valve seat 15. This plug 36 is preferably formed of a softer metal than the valve seat 15, but one in which the coefficients of expansion of these contacting metals will be substantially the same. The head block 30 is cut across its top to form a transverse slot 37. Mounted in this slot is a cam lever 38 which is pivoted upon a pin 39 extending across the head cap 30 and forming a pivotal support for the lever 38. The lever 38 has formed thereon a nose 40 provided with a cam face 41 which engages the solid head 27 secured to plunger 22. When the lever 38 is swung from the up position of Fig. 4 to a position at right angles thereto, the cam face 41 will force the plunger 22 inwardly and cause firm engagement of valve block 36 with valve seat 15, as clearly shown in Fig. 2, at which time gas to be supplied from gas container 42 will be effectively sealed from escape.

Figure 3:
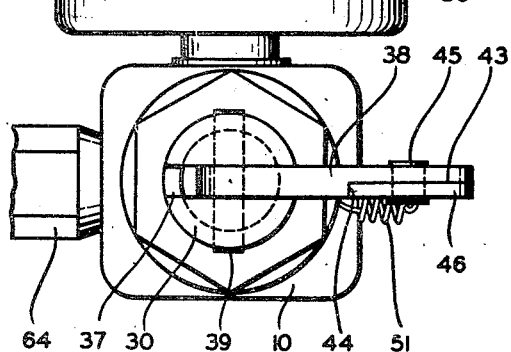
Fig. 3 is a top plan view of the valve mechanism with the lever in down folded position.

The lever 38 is provided with a part cut away at its side at 43, and has a right-angled ledge 44 at the inner end of said cut-out portion 43, all as clearly shown in Figs. 1 and 3. Secured by means of a rivet pivot 45 to lever 38 within cut-out portion 43 is a lever extension 46. This extension is provided with a head 47 and two walls 48 and 49 connected by a curved face 50, the walls 48 or 49 being adapted to engage the ledge 44 in one or the other of its positions. The wall 48 is held in engagement with the ledge 44 when the lever section is pulled into its extended position as in Fig. 4, and the wall 49 is normally held engaging the ledge 44 to bring the lever extension into its folded position as shown in Fig. 2 and in dotted lines in Fig. 4. The lever section 46 is normally held in its folded position with the wall 49 engaging the ledge 44 by a coil spring 51 pivoted at 52 to the body of lever 38 near its under side and pivoted at 53 to the under side of the pivoted lever extension 46. This spring, as clearly shown in Fig. 4, is connected to the lever portions 38 and 46 so as to be inside of the axial center of pivot 48 and thus when free always to operate to pull the lever into the folded position of Figs. 1 and 2 and the dotted line position of Fig. 4.

The combined lever formed by the parts 38 and 46 is of substantial extent and makes available an effective long lever for quick opening of the valve, thus requiring only moderate effort with one hand of the operator to effect that opening with a single movement. Yet the extended lever automatically folds itself so as to be positioned normally out of the way where it will not be caught upon or pulled by hands or clothing of the pilot operator, and also where it will be out of the way while the cylinder is being filled with fresh gas.

When gas pressure is high, that alone will open the valve, after the lever system is swung to the position of Fig. 4. Other means is provided to open the valve when pressure is low. For this a pin 54 extends through openings 16 and 19 and engages a floating head 55 in the cylindrical chamber 20. The head 55 is provided with an annular shoulder 56 which is engaged by a compression spring 57. The lower part of the spring is held by engagement with the inner end 58 of an externally threaded head section 59 of a tube 60. The threaded section 59 is screwed into the internal threads 21 of the bottom part of opening 20. Thus when the plunger 22 is moved by the cam 40, 41 on lever 38 to the valve closing position of Fig. 2, the spring 57 is compressed and the flexible metal washer 25 slightly distorted, as clearly shown in Fig. 2; and when the valve levers are moved to the upper or opening position, the spring 57, when gas pressure is low, will instantly move the plunger 22 away from the valve seat 15, with the result that gas coming from the container 42 will pass through tube 60, pass the valve seat 15 to chamber 61, Fig. 4, and from there go to chamber 62 from which it will be conducted to the delivery tube 63 through the following means:

A casting 64 opens through central passageways 65 to chamber 62 when the externally threaded extension 66 of said casting 64 is screwed into the internally threaded cylindrical walls of chamber 62, as best shown in Fig. 5. A second casting 67, Figs. 2 and 5, has an externally threaded annular extension 68 adapted to be screwed into an internally threaded annular portion 69 of casting 64. A metal-to-metal seal is effected by contact of a sealing ring 70 with the annular end 71 of casting 64. Likewise, a metal-to-metal seal is effected between casting 64 and casting 10 by contact of annular flange 72 with the wall 73 of casting 10, as shown in Fig. 5. Thus these parts are all united so as to produce a metal-against-metal seal, as is true of all joints in the whole valve structure. A screen 83 is positioned in a narrowed chamber 84, Figs. 2 and 5, to insure that no particles of dust however small, reach the capillary limit opening 78.

The casting 67 is provided with a nipple extension 74 to which the gas delivery hose 63 is attached. The nipple extension has therein a passageway 75. A capillary limit port tube 76, preferably of glass or other material with a substantially negligible coefficient of expansion, is secured in the casting 67 in gas-tight relation by means of an annular body of cement 77. The bore 78 through member 76 is shown very greatly exaggerated in its dimensions for ease of inspection. Preferably it will be slightly conical throughout its length and in its smallest part will be of a diameter closely approaching that of a capillary opening. The gas delivered is oxygen which is one of the most free-flowing gases known. The limit port is of a size such that when the valve is fully open sufficient oxygen gas will be supplied the breather without undue waste thereof, and the fact that it is formed of material which has a low or practically negligible coefficient of expansion, insures that the size of the limit port will not be substantially affected by changes of temperature or air pressure.

The casting 64 and parts attached thereto are readily removable at which time the cylinder may be applied to a filling yoke of known construction. During filling the lever assembly 38, 46 will be in the position of Fig. 4, thus opening the passageway 62 through the valve assemblage and the tube 60 therein into the cylinder 42. When the cylinder is filled with gas to a desired pressure as shown by the gauge 80, the lever system is swung to the closing position of Fig. 2, and the assemblage can be withdrawn from the filling yoke and casting 64 and attached parts reassembled for use of the apparatus. This feature is a simple and effective one for the purpose and secures against leak wastage during the filling operation.

The gauge 80 has its shank 81 threaded into the transverse chamber 17 as shown in Fig. 6, there being an opening 82 extending through the shank 81, whereby the interior of the gauge, of common construction, not shown, is at all times subject to gas pressure of the cylinder or tank to which the valve closure structure has been applied. The aviator or other person employing the outfit for parachute escape purposes is thus at all times able to be informed of the pressure of gas and corresponding availability of gas supply in the reserve tank.

The advantages of my invention will quite fully appear from the above description. A fundamental and essential advantage is that a valve closure structure is provided which embodies a lever system so constructed and related to other parts that the valve may be instantly opened with a single movement of one hand only.

A further great advantage is found in the fact that all joints are sealed by metal-to-metal contact, insuring against leaks which otherwise might develop from the use of gaskets, packing and the like.

A further advantage is the provision of limit port means connected with the valve structure at one side thereof and so it may be conveniently removed to permit the cylinder tank to be readily filled and refilled with the desired gas.

I claim:

1. Quick opening valve mechanism for controlling gas delivery, comprising a valve block having a passageway therethrough surrounded at one end by a valve seat, means adapting said block to have connection of the passageway with a source of gas under pressure, a chamber formed in the block extending to and about said valve seat, a metal plunger in the chamber, a plug of softer metal in the plunger for engaging the valve seat, a spring in the passageway, a thrust pin having contact with the plunger actuated by the spring which engages the plunger and tends to force it away from the valve seat, said plunger having a part extending out of one end of the valve block, an elongated handle having cam engagement with said extended end of the plunger for moving the same to cause closure of the valve, and a metal diaphragm sealed to the plunger and the valve block for preventing escape of gas from the chamber, all sealing means in the valve casing being effected by metal to metal contact.

2. Quick opening valve mechanism for controlling gas delivery, comprising a valve block having a passageway therethrough surrounded at one end by a valve seat, means adapting said block to have connection of the passageway with a source of gas under pressure, a chamber formed in the block extending to and about said valve seat, a metal plunger in the chamber adapted to engage the valve seat, a spring in the passageway with means connecting it with the plunger for tending to force the plunger away from the valve seat, said plunger having a part extending out of one end of the valve block, an elongated two-part handle pivoted to and extending outwardly from the end of the block when the plunger has been thrust by the spring into valve opening position, a cam head on the lever engageable with the extended part of the plunger and adapted to force it into valve closing position when the lever is swung transversely, the outer part of said lever being broken at its point of joinder with the pivoted part of the lever to be swung down to a position alongside the outer wall of the valve block when the lever has been swung to close the valve.

ORIS J. SMITH.